US006422550B1

(12) United States Patent

Stiefel et al.

(10) Patent No.: US 6,422,550 B1
(45) Date of Patent: Jul. 23, 2002

(54) EXTENDING CLAMP

(75) Inventors: Michael Stiefel, Skokie; Jacques E. Hoffman, Lincolnwood, both of IL (US)

(73) Assignee: Intertech Corporation, Skokie, IL (US)

( * ) Notice: Subject to any disclaimer, the term of this patent is extended or adjusted under 35 U.S.C. 154(b) by 0 days.

(21) Appl. No.: 09/893,289

(22) Filed: Jun. 27, 2001

Related U.S. Application Data

(60) Provisional application No. 60/215,263, filed on Jun. 30, 2000.

(51) Int. Cl.[7] .................................................. B23Q 3/08
(52) U.S. Cl. ............................................ 269/32; 269/24
(58) Field of Search ............................... 269/32–35, 24, 269/31, 27, 25, 134–138, 157, 160, 162, 217, 233, 234

(56) References Cited

U.S. PATENT DOCUMENTS 2,908,205 A * 10/1959 Furman et al. ............... 269/32
3,700,227 A * 10/1972 Sessody ........................ 269/24
4,830,349 A * 5/1989 Miyata ......................... 269/32
5,181,701 A * 1/1993 Yonezawa ..................... 269/32
5,752,693 A * 5/1998 Brisco .......................... 269/24
5,979,886 A * 11/1999 Craft et al. .................. 269/24

* cited by examiner

*Primary Examiner*—Joseph J. Hail, III
*Assistant Examiner*—Lee Wilson
(74) *Attorney, Agent, or Firm*—Fitch, Even, Tabin & Flannery

(57) ABSTRACT

A hydraulically driven extending clamp is disclosed having a pivoting main body which includes an extendable clamping rod disposed therein. The clamping rod extends above the pivot and is extended by air pressure and retracted by a spring internal to the clamping rod. A retaining member extends through a slot in the clamping rod and forms a travel limit stop as well as a retraction spring contact point. A hydraulic cylinder pivots the main body in seesaw-like fashion to apply clamping forces.

12 Claims, 3 Drawing Sheets

EXTENDING CLAMP

This application claims priority from Provisional application Ser. No. 60/215,263,filed Jun. 30, 2000.

BACKGROUND OF THE INVENTION

The present invention relates to fluid pressure driven clamps and particularly to such clamps which include an extendable clamping member.

Extending clamps generally comprise a clamping member which can be moved away from a clamping area and which can return to the clamping area to apply clamping forces to an object placed in the clamping area. Such clamps are useful in present day industrial environments, particularly where successive parts are to be appropriately placed before the clamp and then clamped. It is desirable to have a clamp with a relatively long extension which can apply large clamping forces with minimum power required both for extension and clamping. These goals have not been achieved with known clamps. Clamps which are capable of large clamping forces tend to be physically large and have limited extension. Conversely, clamps which have long possible extension typically are not capable of large clamping forces.

SUMMARY OF THE INVENTION

These limitations in prior extending clamps are overcome in accordance with the embodiments herein which describe a compact extending clamp capable of relatively long extension and large clamping forces. The clamp of the embodiment includes a main clamping block which incorporates most of the active parts of the extending clamp assembly. The main block is pivotably mounted to a stationary mounting plate which is affixed to a surface against which clamping is to occur. The main block of the embodiment is constructed of a solid metal block into which openings are formed to convey control fluids and to retain the moving parts of the assembly. The clamping end of the main block is referred to as the outward end. A pressure cylinder is disposed within the moving block at the other end, called the inward end, of the main block so that the pivoting of the main block results in a seesaw motion of the inward and outward ends of the main block. The clamping cylinder may, for example, be a hydraulic cylinder which receives fluid under pressure from an inlet at the inward end of the main block. Advantageously, the clamping cylinder is disposed near the pivot at an outward angle to increase the lever arm available for clamping forces. The outward end of the main block is raised in the absence of hydraulic pressure in the cylinder by a spring on the outward side of the pivot.

The clamping forces are applied to objects to be clamped by the clamping rod which is slidably disposed within the main block. The clamping rod in its retracted state extends from the outward end of the main block, crossing above the pivot and ending on the inward side of the pivot. An air cylinder is disposed within the main block to extend the clamping rod by means of compressed air applied at an inlet connected to the inward end of the main block. The clamping rod has a slot along its length which, in conjunction with a retaining member of the main block performs a number of significant functions. The retaining member extends through the slot in sliding contact therewith. An outward end of the slot contacts the retaining member to define the maximum retraction of the clamping rod. Similarly, an inward end of the slot contacts the retaining member to define the maximum extension of the clamping rod. The retaining member, by extending through the slot also serves to keep the clamping rod from rotating and thus keeps the clamping surface of the clamping rod in a downward position. Advantageously, the embodiment shows a clamping rod retraction spring disposed within a central bore formed within the clamping rod. The spring provides retraction forces by urging against an inward end of the clamping rod bore and against the retaining member.

DESCRIPTION

Figure 1A:
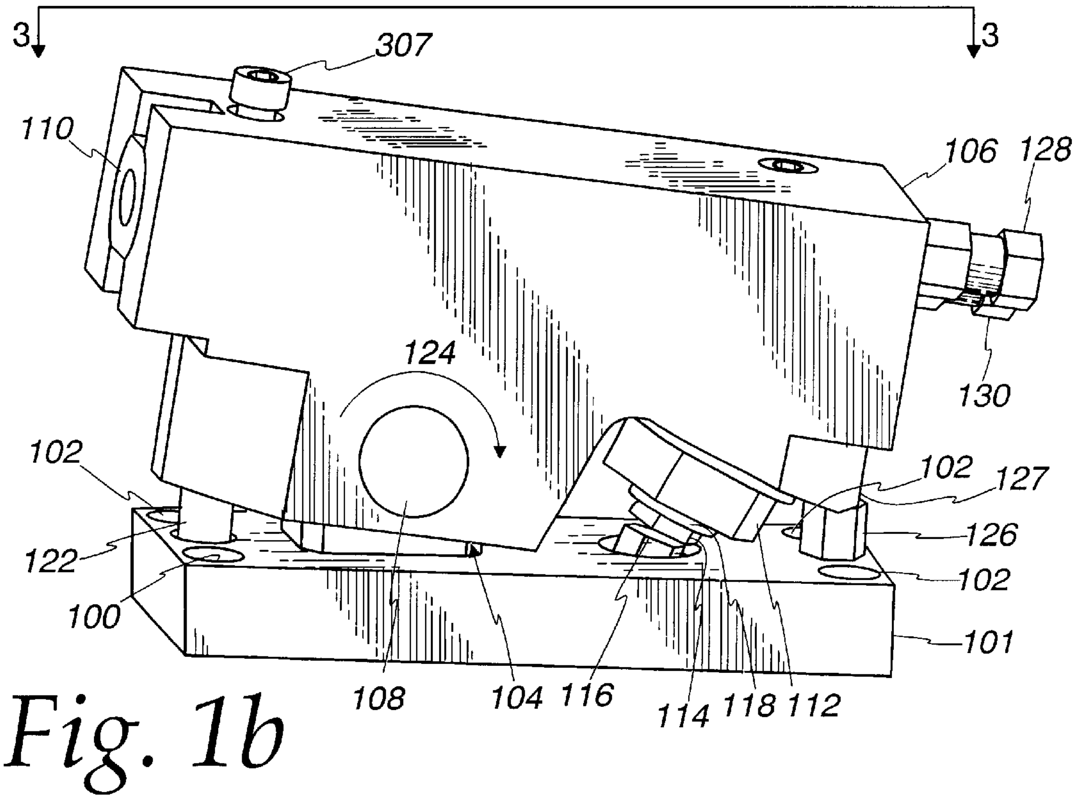
FIGS. 1*a*, 1*b* and 1*c* are perspective views of an extending clamp in rest, extended and extended with clamping positions respectively.
Figure 1B:
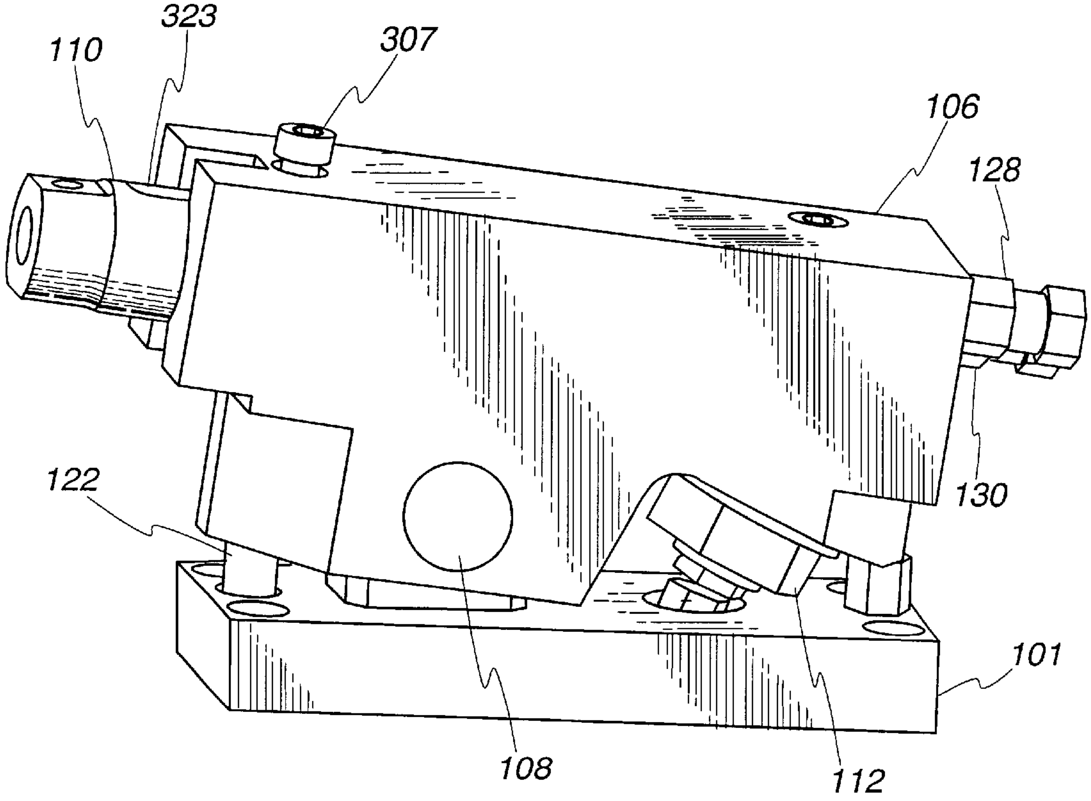
Figure 1C:
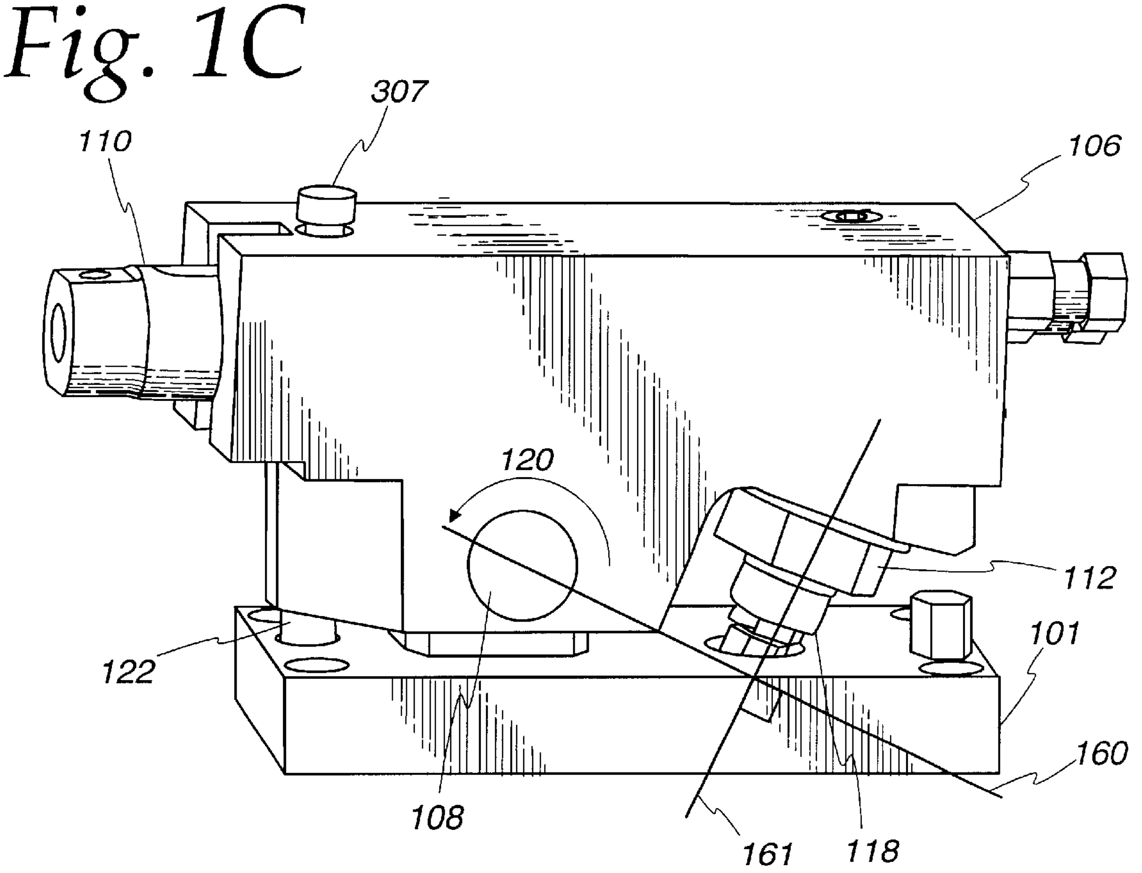

FIGS. 1*a*, 1*b* and 1*c* show a perspective view of three different operational states of an extending clamp. The clamp includes a stationary mounting plate 101 which is affixed by means of fasteners through holes 102 to a surface (not shown) against which clamping force is to be applied. Mounting plate 101 comprises a pivot assembly 104 which preferably mounts a pivoting main block 106 by means of a pivot 108. Pivot 108 may comprise, in part, a Teflon® coated metal bushing. Main block 106 includes a clamping rod 110 which can be extended from the main block 106 as shown in FIG. 1*b* and retracted as shown in FIG. 1*a*.

Pivoting main block 106 also comprises a hydraulic cylinder 112 having a relatively movable contact point 114 in abutting contact with the stationary main plate 101 at a contact point 116. The piston 118 of clamp cylinder 112 is hydraulically driven by hydraulic fluid introduced into the main block 106 to pivot the main block 106 in the direction shown by arrow 120 (FIG. 1*c*). When the hydraulic pressure is reduced, a pivot return spring 122 returns the main block 106 in the direction shown by arrow 124 to the rest position shown in FIG. 1*a*. The rest position is limited by an abutment 127 of the main block 106 which contacts a stop 126 of the mounting plate 101 to complete rotation in the direction shown in by arrow 124.

Figure 3:
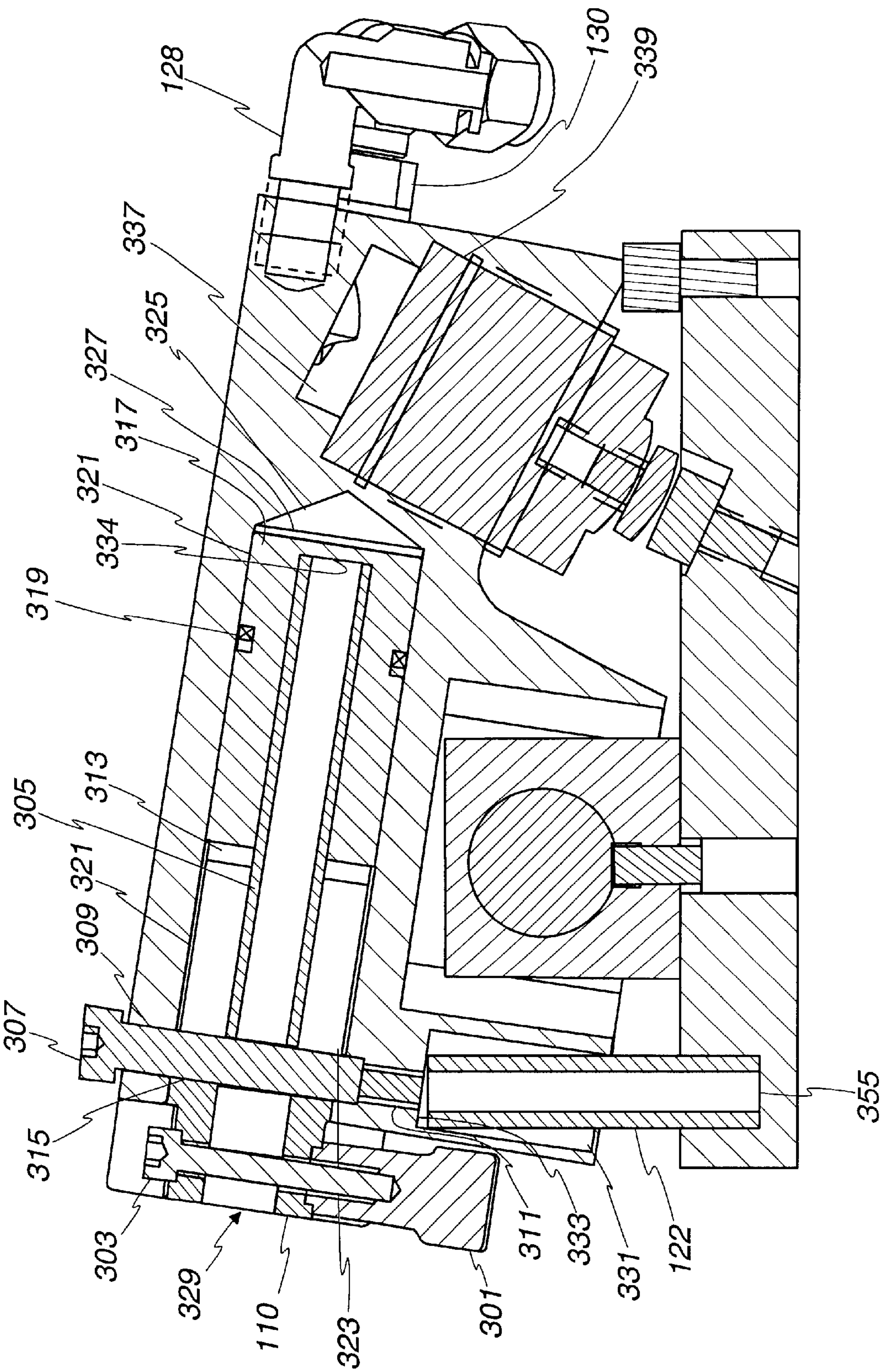
FIG. 3 is a cross-sectional view of the clamp along the section line 3—3 of FIG. 1*a*.

The clamping rod 110 may be driven outwardly (FIG. 1*c*) by air pressure supplied at an inlet 128 and retracted to the position shown in FIG. 1*a* by an internal spring 305 shown in FIG. 3. The hydraulic fluid pressure to forcefully rotate the main block 106 in the direction shown by arrow 120 is provided via inlet 130.

FIG. 3 is a cross section of the clamp taken vertically from section line 3—3 shown in FIG. 1*a*. In FIG. 3 a clamping anvil 301 is shown attached to clamping rod 110 by a bolt 303 through the clamping rod near its outward end. When the clamping rod 110 is extended, the clamping anvil 301 extends with it. The main block 106 includes a clamp rod bore 321 which is produced by machining or other processes. The clamping rod 110 is inserted into the bore 321. The clamping rod 110 includes an inward end 317 which forms a piston for movement in response to air pressure from inlet 128 in fluid communication with a chamber 325 via a conduit (not shown). Air pressure introduced into chamber 325 works against piston end 327 to apply extension force to the clamping rod 110. The piston 317 of clamping rod 110 also includes a seal 319 which may comprise an O-ring seal to retard the leakage of air pressure past the piston 317.

Internal to clamping rod 110 is a central bore 329 which extends from the outward end of the clamping rod to the piston 317. A spring 305 is disposed within the bore 329 and extends from an inward end 334 of the bore to a bolt 307. The clamping rod 110 also comprises a slot 323 having an inward end 313 and an outward end 315 shown in FIG. 5 abutting the bolt 307. As the clamping rod is driven outwardly by an increase in air pressure in chamber 325, spring 305 is compressed between bolt 307 and bore end 334. This compression returns the clamping rod to the rest position shown in FIG. 3 when the air pressure in chamber 325 is released.

An extending clamp, by its very nature, applies clamping forces by means of a movable clamping rod. In order to provide a good product lifetime using affordable parts, it has been recognized that a significant portion of the clamping rod 110 should remain within the main body 106 at the time of clamping. The present embodiment provides the axis of motion of the clamping rod 110 over the top of the pivot from the outward to the inward end of the main block. This permits a relatively long clamping rod and thus allows a significant amount of the clamping rod to remain within the main block at clamping. Additionally, the long clamping rod discussed allows the use of a long return spring 305.

Figure 2:
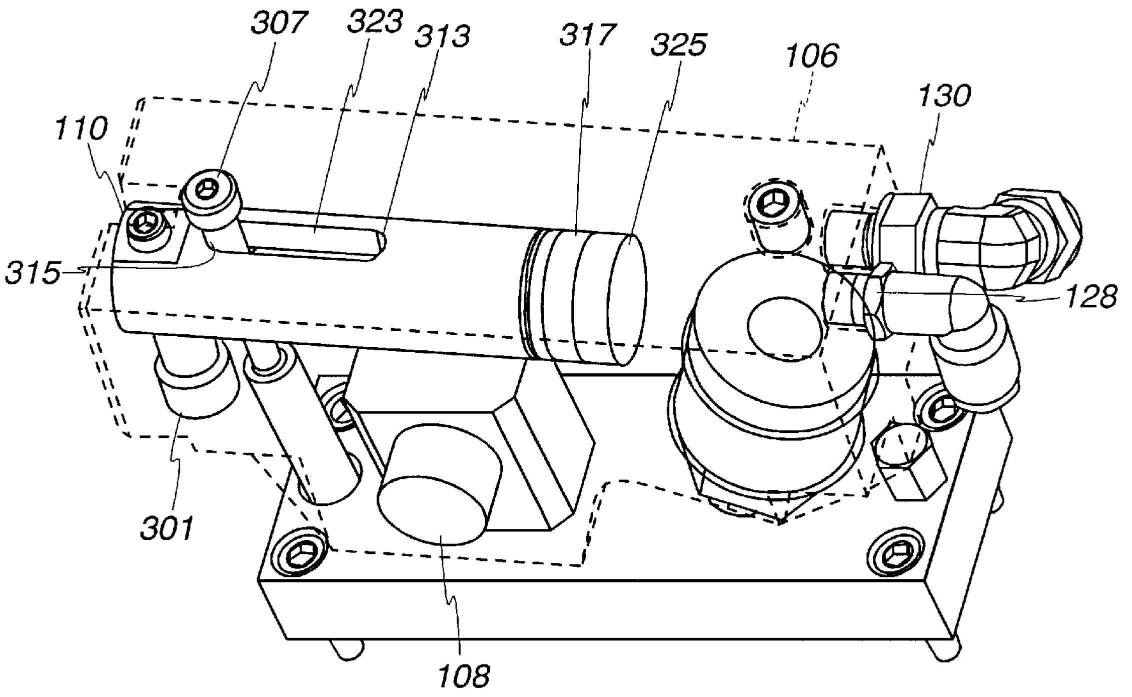
FIG. 2 is a transparent perspective view of the main block of the extending clamp.

Bolt 307 is disposed through a hole 309 which extends from the top of main block 106, through the slot 323 in the clamping rod 110, and into a threaded fitting at 311. The placement of bolt 307 with respect to the main block 106 and the clamping rod 110 is also shown in FIG. 2. The maximum and minimum extension of the clamping rod 110 are determined by the length and positioning of the slot 323. In the retracted (rest) position, the spring forces the clamping rod inwardly until the slot end 315 contacts the bolt 307. When air pressure in chamber 325 acting against piston face 327 overcomes the spring 305 forces, the clamping rod extends to its outward position in which slot end 313 is driven into contact with bolt 307.

Main block 106 also includes a cylindrical opening 331 which receives a portion of pivot return spring 122. The opening 331 includes an end 333 which captures spring 122 between itself and a block 335 of stationary mounting plate 101. When hydraulic fluid pressure rises in a chamber 337, from inlet 130, a piston 339 is driven downwardly against stop 116 which rotates the main block 106 against the spring 122. Similarly, when hydraulic pressure drops, the spring 122 forces rotation of main block 106 to the rest position of FIG. 3. In the present embodiment, cylinder 112 is disposed at an angle away from vertical. The orientation of the cylinder 112, and contact point 116 is such that, at the position of main block 106 during maximum clamping forces, a line, e.g. 160 (FIG. 1*c*) drawn through the axis of pivot 108 intersects a line, e.g. 161, along the axis of cylinder 112 at a 90° angle. This orientation reduces greatly the abrasive forces between contact point 116 and movable contact point 114, providing an improved product lifetime.

In use, an item to be clamped is moved to a position predetermined by the placement of mounting plate 101, the position of bolt 307 and the length of slot 323. Initially, both air pressure and hydraulic pressures are below the point at which spring forces from springs 122 and 305 control. Thus, the clamping rod 110 is withdrawn and the main block 106 is in the rest position. This selection is shown in FIG. 1*a*. After placement of the item to be clamped, air pressure is increased to extend clamping rod 110 until surface 313 of slot 323 meets the bolt 307 (FIG. 1*b*). At this time hydraulic pressure is increased to a predetermined amount to apply clamping forces by the outward end, e.g. 301, of clamping rod 110 to the item to be clamped (FIG. 1*c*). At the completion of clamping, hydraulic pressure is decreased, followed by a decrease of air pressure so that the clamp again assumes the rest position shown by FIG. 1*a*.

While there have been illustrated and described particular embodiments of the present invention, it will be appreciated that numerous changes and modifications will occur to those skilled in the art, and it is intended in the appended claims to cover all those changes and modifications which fall within the scope of the present invention.

What is claimed is:

1. An extending clamp comprising:

a main block having an outward end and an inward end and being pivotably mounted to a mounting surface;

a clamping rod disposed within the main block and extendable from the outward end thereof;

a clamping rod fluid pressure cylinder responsive to fluid pressure for extending the clamping rod from the main block; and a pivot fluid pressure cylinder disposed within the inward end of the main block for pivoting the main block outward end toward the mounting surface.

2. An extending clamp according to claim 1 comprises a spring disposed within the clamping rod for urging the clamping rod toward the inward end of the main block.

3. An extending clamp according to claim 2 wherein the clamping rod has a length and includes a longitudinal slot therethrough.

4. An extending clamp according to claim 3 comprising a retaining member disposed in sliding contact through the slot in the clamping rod.

5. An extending clamp according to claim 3 wherein the retaining member comprises a bolt extending through the slot and at least one end of the bolt is removably attached to the main block.

6. An extending clamp according to claim 3 wherein the spring contacts the retaining member at an outward end and contacts an end of the bore in the clamping rod at an inward end.

7. An extending clamp according to claim 3 wherein the slot has an inward end on an outward end, and the extension of the clamping rod is limited by contact between the retaining member and the inward end of the slot.

8. An extending clamp according to claim 7 wherein the clamping rod cylinder is an air pressure cylinder.

9. An extending clamp in accordance with claim 8 wherein the main block comprises a pressurized air inlet in fluid communication with the clamping rod fluid pressure cylinder.

10. An extending clamp according to claim 1 comprising a spring for urging the outward end of the main block away from the mounting surface.

11. An extending clamp according to claim 1 wherein the pivot fluid pressure cylinder comprises a hydraulic cylinder.

12. An extending clamp in accordance with claim 11 wherein the main block comprises a hydraulic fluid inlet in fluid communication with the pivot fluid pressure cylinder.

* * * * *